Patented May 26, 1953

2,640,088

UNITED STATES PATENT OFFICE 2,640,088

VULCANIZATION ACCELERATORS

Harry D. Glenn and Ivan Mankowich, Naugatuck, Conn., assignors to United States Rubber Company, New York, N. Y., a corporation of New Jersey No Drawing. Application January 6, 1950, Serial No. 137,261

3 Claims. (Cl. 260—747)

This invention relates to the preparation of vulcanization accelerators for incorporation into rubber, and to the product thereof.

Various vulcanization accelerators of the so-called carbon disulfide type (see Davis & Blake, "Chemistry of Technology of Rubber," Reinhold Pub. Corp., 1937, pages 296–303, 743–744) such as the "thiazoles" (benzothiazole derivatives): 2-mercaptobenzothiazole, zinc salt of 2-mercaptobenzothiazole, 3-anilinomethyl-2(3)-benzothiazolethione, dibenzothiazyl disulfide; the "thiurams" (thiuram sulfides): tetramethyl thiuram monosulfide, tetramethyl thiuram disulfide, tetraethyl thiuram disulfide; the "dithiocarbamates" (salts of dithiocarbamic acids): zinc dimethyl dithiocarbamate, zinc diethyl dithiocarbamate, zinc dibutyl dithiocarbamate, zinc N-pentamethylene dithiocarbamate, 2,4-dinitrophenyl dimethyl dithiocarbamate, selenium diethyl dithiocarbamate, are incorporated in rubber in conventional compounding procedures with various difficulties. Solid accelerators are prepared and sold as fine powders for incorporation in rubber on the conventional rubber mill. One to five per cent by weight of a petroleum oil are added to some commercial accelerator powders. When these finely divided accelerator powders are added to the rubber on the rubber mill they tend to stick to the back (faster) roll and to cake or to fall off, instead of becoming readily incorporated or dispersed in the rubber which is banded around the front (slower) roll; in other words, they do not satisfactorily "wet" into the rubber. These powdered accelerators also tend to drop or fall through the rolls, another consequence of their not "wetting" into the rubber. The powdered accelerators also are carried as dust in the air in the vicinity of the mill, and such dusts are irritating to the mill operator. Dusts from the thiazole accelerators convey an undesirable taste to the mill operator. Dusts from dithiocarbamate accelerators may give mild skin irritations to the mill operator. These disadvantages may be aggrevated by static electric charges frequently formed on these finely powdered accelerators.

The present invention overcomes the disadvantages above referred, and provides further advantages by way of ease of handling and weighing, and reduction of mixing time, and other advantages which will be apparent from the following description of the invention.

According to the present invention, the powdered accelerators are formed into free flowing aggregates or pellets or granules by means of a very small amount of a binder comprising rubber latex solids, and preferably also a hardening agent.

The pelletized accelerators are made by mixing the powdered accelerator with the required amount of binder and sufficient water to give a wet paste of the proper consistency for extrusion through a screen or perforate die in a conventional pellet forming machine, and extruding the paste in columnar form. The extrudate may be cut off with a wire or knife affixed to the extruder head to give directly pellets of the desired length; or the paste may be continuously extruded, allowing the extrudate to break off naturally of its own weight into lengths equivalent to a number of pellets. These lengths may be broken up into short segments by dropping them on to a ridged shaking screen or a gyro-screen or tumbling them in a tumbling barrel. An advantage to such tumbling or shaking action is to round off the ends of the individual segments. The lengths of the segments will be greater than their greatest cross-sectional dimension. The pellets may be dried and packaged.

The amount of rubber latex solids to properly bind the particles of accelerator powder in the pellets of the present invention is extremely critical if the disadvantages due to the powdering are to be overcome without introducing new difficulties. Five hundredths of a part of dried rubber latex solids per 100 parts of accelerator appears to be the minimum amount of latex solids that will give the improvement of the present invention. All parts and percentages referred to herein are by weight. With less than 0.05 part of latex solids per 100 parts of accelerator, there is insufficient rubber binder to prevent the pellets from powdering on the mill before being incorporated in the rubber mass banded on the front roll. Such powdering of the pellets gives rise to the disadvantages accompanying the conventional use of straight powdered accelerators. With less than 0.05 part of latex solids per 100 parts of accelerator, the advantages of the present invention are not obtained even in the presence of up to 5 percent or more of non-rubber hardening agents, such as glues, clays, vegetable gums, silica gel and the like. The improvement of the present invention is maintained from 0.05 to 3.5 parts of latex solids per 100 parts of accelerator powder. The pellets of the present invention may be incorporated sufficiently faster into the rubber to reduce the mixing time for addition of the accelerator by as much as 40 to 50%. More than 3.5 parts of latex solids per 100 parts of accelerator gives a pellet which has a rubbery feel, even with up to 5% or more of a hardening agent. Such rubbery type of pellets while reducing dusting and the disadvantages incident thereto, lump or pack together in shipping, and have a drag which impedes free-flowing. It is not feasible to eliminate the rubbery drag and tendency to lump or pack together of pellets having over 3.5 parts of latex solids per 100 parts of accelerator by coating or tumbling the pellets with straight powdered accelerator since the accelerator powder on the coating would dust and have the disadvantages of conventional powdered accelerators.

We have found it especially advantageous and desirable to increase the physical hardness of the pellets to eliminate any tendency of the pellets to become flattened in handling and shipping, which causes lumping or packing in the containers. Where compounding ingredients, for example, are weighed out on one floor and gravity fed in chutes to rubber masticators on a lower floor, the compounding ingredients must be free-flowing. The addition of 0.1 to 5 parts of hardening agent per 100 parts of accelerator in addition to the latex rubber binder in the pellets of the present invention eliminates any tendency of the pellets to flatten out in shipping and storage and thus reduce their free-flowing properties. Such hardening agents may be proteins, such as glue, gelatin, and casein; vegetable gums, such as gum tragicanth, locust bean gum, gum arabic and gum karaya; starches; dextrose; carboxy alkyl celluloses, such as carboxy methyl cellulose and carboxy ethyl cellulose; silica gel; rosin soaps. The hardening agent may conveniently be added separately, or may be mixed with the latex similarly to conventional latex compounding ingredients before the latex and hardener mixture is added to the accelerator powder. The chemical processes for manufacturing solid accelerator chemicals involve a final wet precipitation of the chemical, followed by conventional filtering, drying, and grinding, if necessary. It is common practice in precipitating some accelerators to bring down 1 to 5% of petroleum oil with the accelerator to give a somewhat less dusty powder. Such powdered accelerators with oil, however, do not completely eliminate dusting, and in commercial use have been found to retain most of the disadvantages accompanying the use of accelerator powders without oil. Since the pellets of the present invention are dust free, it is unnecessary to include the 1 to 5% petroleum oil with the accelerator, although the oil may be included in the accelerator powder in the pellets of the present invention if the oil is desired for compounding purposes.

In forming the pellets of the present invention, the latex, and hardening agent, if used, may be added to the conventional wet or dry ground accelerator powder, or to the wet filter press cake of the precipitated accelerator if it is prepared by precipitation from an aqueous medium and is of a satisfactory fineness, and any water needed to give the requisite paste consistency for extrusion. The amount of water to give an extrudable paste of the accelerator powder and latex will vary depending on the particle size and the inherent physical properties of the accelerator to be pelletized, and will generally be from 15 to 100 parts of water per 100 parts of accelerator. For example, with tetramethyl thiuram monosulfide which precipitates in the form of a fine powder which when dry will pass through a 275 mesh screen up to 60 parts of water (including water of the latex) per 100 parts of accelerator will give an extrudable paste. With tetramethyl thiuram disulfide which when dry will pass through a 275 mesh screen, 30 to 40 parts of water per 100 parts of accelerator will give an extrudable paste. With dibenzothiazyl disulfide which when dry will pass through a 275 mesh screen, 70 to 80 parts of water per 100 parts of accelerator will give an extrudable paste.

The present preferred latex is natural rubber latex, such as normal, or concentrated (creamed or centrifuged) latex of 55 to 70% solids concentration, and this has been found to be preferable with respect to its ease of wetting into the rubber to be compounded. In fact, accelerator pellets made with natural rubber latex were wet into a synthetic rubber to be compounded, such as GR-S rubber (copolymer of butadiene and styrene) even better than accelerator pellets made with GR-S synthetic rubber latex binder. However, the use of natural rubber latex, or synthetic rubber latex, as illustrated in the commercial butadiene polymer latices, namely, butadiene-styrene (GR-S) copolymer latex, or butadiene-acrylonitrile (GR-A) copolymer latex, or polychloroprene (neoprene) latex, or mixtures thereof, as a binder is clearly within the scope of our invention. Generally, such synthetic rubber latex may be an aqueous emulsion polymerizate of one or more butadienes-1,3, for example, butadiene-1,3, 2-methyl-butadiene-1,3 (isoprene), 2-chloro-butadiene-1,3 (chloroprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene and vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride. The term "latex" or "rubber latex," as used herein, includes such natural and synthetic rubber latices, and mixtures of the same.

The pellets of the present invention are homogeneous and substantially uniform in size. The cross sectional shape and dimensions will be determined by the shape and dimensions of the holes in the extruder head. The average cross sectional diameter of the presently preferred cylindrical shaped pellets may be from 0.05" to 0.15", i. e. 0.1" plus or minus 0.05" and the average length from 1/8" to 1/4" i. e. $\frac{3}{16}$" plus or minus $\frac{1}{16}$". Instead of pellets of circular cross section, the pellets may have elliptical, triangular, square, rectangular, or other polysided cross sections, the average greatest cross sectional dimension of the pellets being from 0.05" to 0.15", and the average length from 1/8" to 1/4".

The following examples illustrate the present invention:

*Example I*

In a 30 gallon mixer with a 20 gallon working capacity, were placed 50 pounds dry weight of dried precipitated tetramethyl thiuram monosulfide which passed through a 275 mesh screen without grinding, 6.7 pounds of water, 1.15 pounds of natural rubber latex of 65% solids content, and 1.15 pounds of a 65% aqueous solution of sodium rosinate. The batch was thoroughly mixed, transferred to an extrusion machine, extruded under a direct-screw pressure through a plate having between 100 and 200 one-tenth inch diameter circular orifices. The extrudate broke off into strings or short spaghetti-like lengths which were allowed to drop onto a downwardly positioned ridged shaking screen which broke up the strings into segments or pellets of an average length of about $\frac{3}{16}$" plus or minus $\frac{1}{16}$". The product was dried in a hot air oven, and the pellets packaged for shipment.

The thus formed pellets could be added to rubber on a mill roll at a very much faster rate than the same accelerator in powdered form and without any dusting or appreciable caking on the back roll or fall-through into the mixing pan below.

*Example II*

Five pounds (2270 grams) of dried tetramethyl thiuram monosulfide powder, 136 grams of a 40% solids GR-S synthetic rubber latex (75% butadiene and 25% styrene) and 1226 grams of water were mixed in an internal mixer of the Werner and Pfleiderer type for 10 minutes. The mix was transferred to an extrusion machine and treated similarly to Example I. The pellets were dried in an air-blown oven at 60° C. for 10 hours. Satisfactory granules were obtained. However, they did not wet into natural rubber or GR-S rubber as readily as the pellets in Example I where natural latex and also a hardening agent were used in the binder.

*Example III*

Satisfactory granules were also made according to the processes of Examples I and II using tetramethyl thiuram monosulfide powder which has precipitated with 2-3 parts of a light petroleum oil ("No. 8 oil") per 100 parts of the accelerator and dried.

*Example IV*

Satisfactory granules were made according to the processes of Examples I and II with various other commercial accelerator powders, viz: tetramethyl thiuram disulfide, tetraethyl thiuram disulfide, zinc dimethyl dithiocarbamate, zinc dibutyl dithiocarbamate, selenium (tetravalent) dimethyl dithiocarbamate, 2-mercaptobenzothiazole, 3-anilinomethyl-2 (3)-benzothiazolethione, and dibenzothiazyl disulfide.

*Example V*

Hundreds of batches of satisfactory pellets have been obtained following the processes of Examples I and II from tetramethyl thiuram monosulfide and the various accelerators in Example IV with 0.5 to 2 parts of solids of various latices, viz natural rubber latex and GR-S, GR-A, and neoprene synthetic rubber latices, per 100 parts of accelerator as the sole binder, and also with 0.5 to 2 parts of rubber latex solids per 100 parts of accelerator as one ingredient of the binder and additionally in different batches, one of each of the following: 0.2-1 part of carboxy alkyl cellulose (carboxy methyl cellulose), 2-5 parts of silica gel, 1-3 parts of protein (glue, gelatin, casein), 1-3 parts of vegetable gum (gum karaya), and 1-3 parts of rosin soap, per 100 parts of accelerator as hardening agent for the other ingredient of the binder.

The amount of latex solids in the accelerator granules or pellets of the present invention is from 0.5 to 3.5 parts, and preferably 1 to 2 parts per 100 parts of accelerator. The amount of hardening agent in the binder for the accelerator powder in the preferred embodiments of the present invention is 0.1 to 5 parts per 100 parts of accelerator powder. The amount of petroleum oil where used (which may be a light, medium or heavy lubricating oil) is 1 to 5 parts, preferably 2 to 3 parts, per 100 parts of accelerator powder.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. As a new product, free-flowing pellets of uniform composition composed of aggregates of a powdered rubber vulcanization accelerator selected from the group consisting of benzothiazole derivatives, thiuram sulfides and salts of dithiocarbamic acids, the particles of said accelerator being held together in pellet form with a binder comprising a mixture of a dried rubber latex solids in amount from 0.05 to 3.5 parts by weight per 100 parts of said accelerator and a hardening agent for increasing the physical hardness and preventing lumping, packing or flattening of the pellets, said hardening agent being selected from the group consisting of proteins, vegetable gums, starches, dextrose, carboxy alkyl celluloses and sodium rosinate, and being present in amount from 0.1 to 5 parts by weight per 100 parts of said accelerator.

2. As a new product, free-flowing pellets of uniform composition composed of aggregates of a powdered rubber vulcanization accelerator selected from the group consisting of benzothiazole derivatives, thiuram sulfides and salts of dithiocarbamic acids, the particles of said accelerator being held together in pellet form with a binder comprising a mixture of a dried rubber latex solids in amount from 0.05 to 3.5 parts by weight per 100 parts of said accelerator and a hardening agent for increasing the physical hardness and preventing lumping, packing or flattening of the pellets, said hardening agent being selected from the group consisting of proteins, vegetable gums, starches, dextrose, carboxy alkyl celluloses and sodium rosinate, and being present in amount from 0.1 to 5 parts by weight per 100 parts of said accelerator, and said pellets being in the shape of columnar segments of lengths greater than their greatest cross-sectional dimension, the average length of the pellets being from $\frac{1}{8}$" to $\frac{1}{4}$", and the average greatest cross-sectional dimension of the pellets being from 0.05" to 0.15".

3. As a new product, free-flowing pellets of uniform composition composed of aggregates of a powdered rubber vulcanization accelerator selected from the group consisting of benzothiazole derivatives, thiuram sulfides and salts of dithiocarbamic acids, the particles of said accelerator being held together in pellet form with a binder comprising dried natural rubber latex solids in amount from 0.05 to 3.5 parts by weight per 100 parts of said accelerator and a hardening agent for increasing the physical hardness and preventing lumping, packing or flattening of the pellets, said hardening agent being selected from the group consisting of proteins, vegetable gums, starches, dextrose, carboxy alkyl celluloses and sodium rosinate, and being present in amount from 0.1 to 5 parts by weight per 100 parts of said accelerator, and said pellets being in the shape of columnar segments of lengths greater than their greatest cross-sectional dimension, the average length of the pellets being from 1/8" to 1/4", and the average greatest cross-sectional dimension of the pellets being from 0.05" to 0.15".

HARRY D. GLENN.
IVAN MANKOWICH.

References Cited in the file of this patent

UNITED STATES PATENTS

| Number | Name | Date |
|---|---|---|
| 1,846,820 | Darling et al. | Feb. 23, 1932 |
| 1,894,168 | Gardner | Jan. 10, 1933 |
| 1,977,748 | Webster | Oct. 23, 1934 |
| 1,979,380 | Gardner | Nov. 6, 1934 |
| 2,053,530 | Noble | Sept. 8, 1936 |
| 2,090,629 | Hiers et al. | Aug. 24, 1937 |
| 2,326,984 | Tomlin | Aug. 17, 1943 |
| 2,343,835 | Smith et al. | Mar. 7, 1944 |
| 2,399,655 | Alton | May 7, 1946 |
| 2,457,962 | Whaley | Jan. 4, 1949 |
| 2,526,120 | Crouch | Oct. 17, 1950 |

FOREIGN PATENTS

| Number | Country | Date |
|---|---|---|
| 270,658 | Great Britain | Apr. 12, 1928 |